(12) United States Patent
Dromaretsky et al.

(10) Patent No.: US 6,309,078 B1
(45) Date of Patent: Oct. 30, 2001

(54) WAVELENGTH-SELECTIVE MIRROR SELECTOR

(75) Inventors: Alexander Dromaretsky, Irvine; Yuri Osipchuk, Foster City, both of CA (US)

(73) Assignee: Axon Instruments, Inc., Union City, CA (US)

(*) Notice: Subject to any disclaimer, the term of this patent is extended or adjusted under 35 U.S.C. 154(b) by 0 days.

(21) Appl. No.: 09/733,575

(22) Filed: Dec. 8, 2000

(51) Int. Cl.[7] .................................................. G02B 7/182
(52) U.S. Cl. ........................... 359/872; 359/871; 359/197; 359/212; 359/223; 359/225
(58) Field of Search ..................................... 359/872, 871, 359/197, 212, 223, 225

(56) References Cited

U.S. PATENT DOCUMENTS

| | | |
|---|---|---|
| 4,795,256 | 1/1989 | Krause et al. . |
| 4,900,934 | 2/1990 | Peeters et al. . |
| 4,917,478 | 4/1990 | Petran et al. . |
| 4,946,279 | 8/1990 | Ohkubo . |
| 5,029,955 | 7/1991 | Chu . |
| 5,332,905 | 7/1994 | Brooker et al. . |
| 5,406,405 | 4/1995 | Sullivan . |
| 5,491,343 | 2/1996 | Brooker . |
| 5,875,043 | * 2/1999 | Ito ......................................... 358/475 |
| 5,936,728 | 8/1999 | Bouzid . |
| 6,057,967 | * 5/2000 | Takahashi et al. .................... 359/641 |

* cited by examiner

*Primary Examiner*—Mohammad Sikder
(74) *Attorney, Agent, or Firm*—Birdwell, Janke & Durando, PLC

(57) ABSTRACT

A wavelength-selective mirror selector. A substantially planar wavelength-selective selective mirror holder is disposed askew to a common optical pathway. The holder has a plurality of mirrors mounted thereon and an axle attached normal thereto for rotating the holder so as to place a selected one of the mirrors in the common optical pathway. A motor is connected to the axle for rotating the mirror holder, either selectively or continuously. When a selected mirror is placed in the common optical pathway, the pathway is split so that an excitation light beam of one wavelength traveling along a source optical pathway from a light source is reflected by the mirror along the common optical pathway toward a sample, while light of a different wavelength propagating back along the common optical pathway passes through the mirror to travel along a detector optical pathway to a detector.

15 Claims, 1 Drawing Sheet

WAVELENGTH-SELECTIVE MIRROR SELECTOR

FIELD OF THE INVENTION

This invention relates to systems for optical imaging in wide-field epifluorescence microscopy, and particularly to the use of alternative wavelength-selective mirrors, such as dichroic mirrors, that pass light of one wavelength range along one optical pathway, while reflecting light of another wavelength range along another optical pathway.

BACKGROUND OF THE INVENTION

In the field of epifluorescence microscopy biochemical material samples that have been Lagged with fluorescent markers often are imaged with a beam of light that excites markers within the samples to fluoresce. The fluorescence light emitted from the sample depends on the markers that have been used with the sample. While a sample is illuminated with excitation light, a microscope images fluorescence light emitted from the sample onto an image detector, such as a CCD array or image tube, in a camera, to determine the spatial distribution of fluorescence light intensity.

It is apparent that the emitted fluorescence light must be distinguished from the excitation light to the detect spatial distribution of fluorescent markers in the sample. This requires spatially separating from a common optical pathway at the sample the respective optical pathways of the incoming excitation light and the outgoing fluorescence light. This is ordinarily accomplished using a wavelength-selective mirror, that is, a device that accepts an excitation light beam emitted by an excitation light source along a source pathway and directs it along the common pathway, and receives fluorescence light emitted by an excited sample along the common pathway and directs it along a detector pathway to a camera. While other types of wavelength-selective devices might be used, dichroic mirrors are particularly suitable for this application because, in addition to their optical property of reflecting light having one wavelength and passing light of different wavelengths, they are typically thin and lightweight.

Often it is desirable to use several different wavelength-selective mirrors in an epifluorescence microscope to accommodate different excitation and emission wavelengths. This requires some mechanism to switch from one mirror to another.

One way of switching mirrors is to use a sliding elongate carriage that has two or more alternative mirrors mounted thereon adjacent one another so that, as the carriage is moved back and forth along its elongate axis, one of the mirrors is selected to interrupt the common pathway of the excitation and emission light beams. However, such mechanisms have relatively slow switching speeds because of the inertia that must be overcome to replace one mirror with another. This limits the speed with which epifluorescence microscopy can be used to process samples. The starting and stopping of such linear devices also tends to impart vibrational energy to the entire imaging instrument.

Another known way of switching mirrors is to mount them on a rotating carousel whose axis of rotation is parallel to the optical axis of the light beam whose wavelengths require separation. This reduces the vibration problem, but makes less certain the registration of different images produced by different fluorescence wavelengths. It also suffers from the problem of inertia where the mirrors are required to start and stop, thereby limiting the speed with which measurements can be made.

Consequently, there is a need for a faster mechanism for switching wavelength-selective mirrors, particularly in wide-field, imaging epifluorescence microscopy where the registration of images at different wavelengths is important.

SUMMARY OF THE INVENTION

The aforementioned need has been met in the present invention by providing, in an epifluorescence imaging microscope, a substantially planar wavelength-selective mirror holder disposed askew to a common optical pathway, the holder having a plurality of mirrors mounted thereon and having an axle attached normal thereto for rotating the holder so as to place a selected one of the mirrors in the common optical pathway. A motor is connected to the axle for rotating the mirror holder, either selectively or continuously. When a selected mirror is placed in the common optical pathway, the pathway is split so that an excitation light beam of one wavelength traveling along a source optical pathway from a light source is reflected by the mirror along the common optical pathway toward a sample, while fluorescence light produced by the sample and directed back along the common optical pathway passes through the mirror to travel along a detector optical pathway to a detector.

Accordingly, it is a principal object of the present invention to provide a novel and improved method and apparatus for selecting wavelength-selective mirrors for placement in a common optical pathway to split that pathway based on the wavelength of light traveling along the pathway.

It is another object of the invention to provide a method and apparatus for selecting wavelength-selective mirrors in an epifluorescence microscope system.

It is a further object of the invention to provide a method and apparatus for rapidly selecting wavelength-selective mirrors in an epifluorescence microscope system.

It is yet another object of the invention to provide a method and apparatus for selecting wavelength-selective mirrors.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
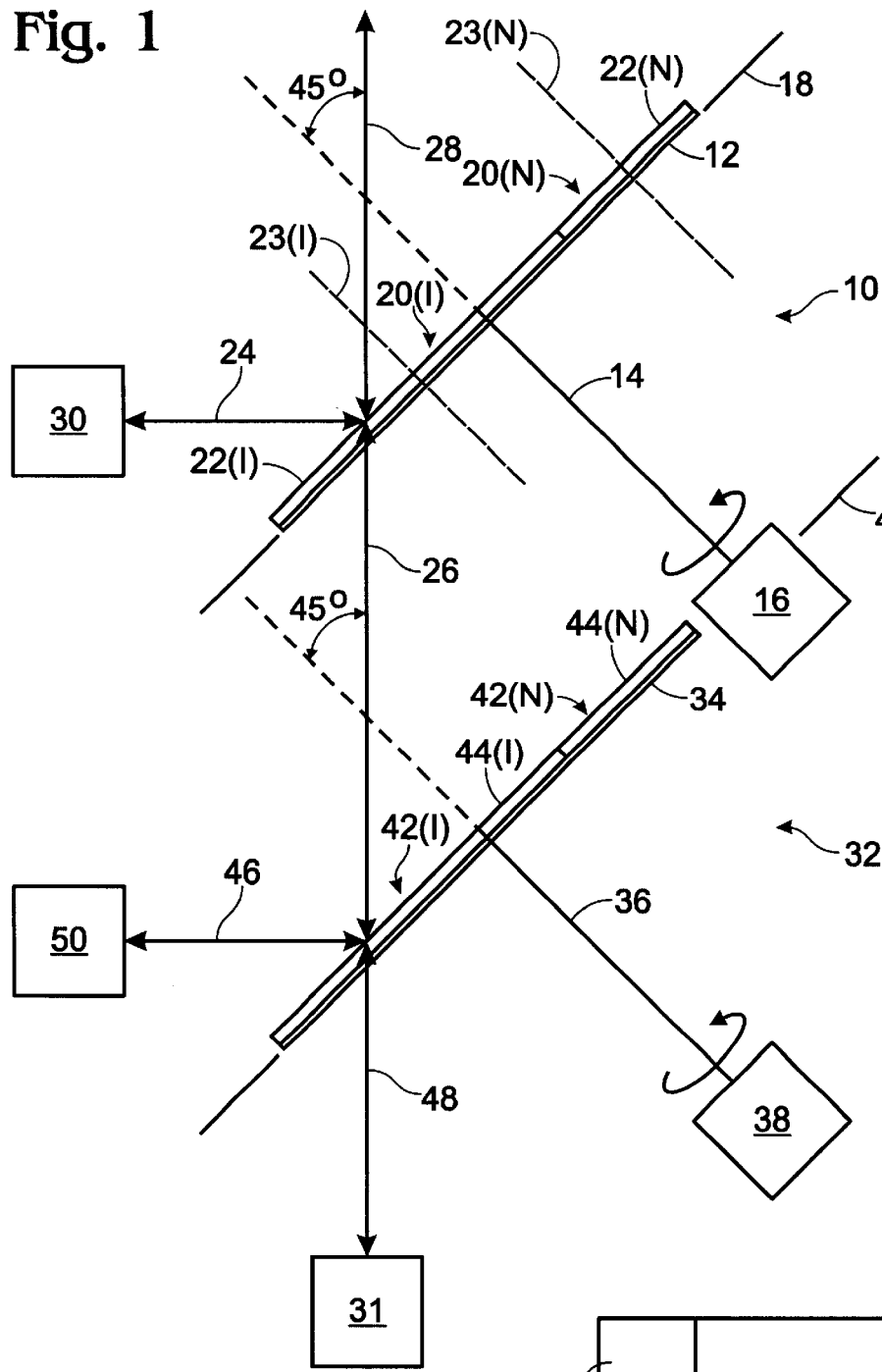
FIG. 1 is a side elevation of a mirror selector according to the present invention.
Figure 2:
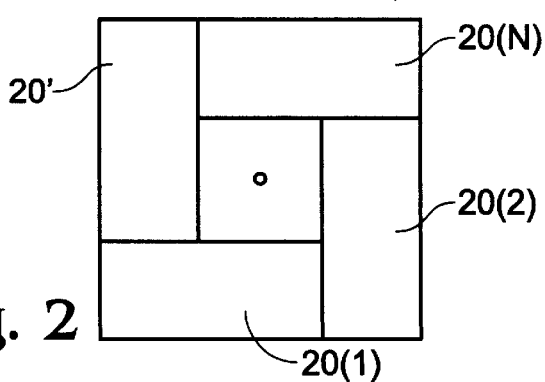
FIG. 2 is a front view of the face of a wavelength-selective mirror holder according to the present invention.

A preferred embodiment of a wavelength-selective mirror selector according to the present invention is shown in FIGS. 1 and 2. In that embodiment a first selector 10 is provided with a substantially planar wavelength-selective mirror holder 12, an axle 14 attached substantially normal to the mirror holder, and a motor 16 for rotating the axle. Preferably, the mirror holder is rectangular shaped, but other shapes could be used without departing from the principles of the invention. The motor and axle rotate the mirror holder in a planar reference surface 18 passing through the mirror holder. A plurality of wavelength-selective mirrors 20(1)–20(N) are mounted on the mirror holder, thereby providing a planar array of mirrors. Each mirror has a reflective surface 22(1)–22(N) substantially parallel to the planar reference surface and, concomitantly, an optical axis 23(1)–23(N) perpendicular thereto. Although the mirrors are shown as having a rectangular shape, other shapes could be used.

The mirror holder 12 is disposed askew to a first optical pathway 24, a second optical pathway 26 and a common optical pathway 28. In an epifluorescence microscope the first optical pathway 24 is typically the initial pathway of excitation light, commonly generated by a light source 30, and the second optical pathway 26 is the final pathway that the emitted light follows to a detector 32. (Here, the second optical pathway passes through a second wavelength-selective mirror selector, as will be explained hereafter.) The first and second optical pathways are combined together in the common optical pathway 28, wherein excitation light propagates in one direction and epifluorescence emitted light propagates in the opposite direction.

The wavelength-selective mirrors 20(1)–20(N) serve to split the common optical pathway 28 into the first optical pathway 24 and the second optical pathway 26. This is accomplished by using mirrors that reflect the wavelength of light propagating along the first optical pathway while passing the wavelength of light propagating along the second optical pathway. Thus, light of a first wavelength, such as excitation light generated by the light source 30, propagates along the first optical pathway 24, reflects off of the reflective surface 22(1) of mirror 20(1), and then follows the common optical pathway 28. Light of a second wavelength, such as epifluorescence emitted light from a sample of material excited by light from the light source, propagates along the common optical pathway 28 toward a mirror 20(1) 20(N), passes through that mirror, and continues along the second optical pathway 26 toward the detector 30.

Preferably, the wavelength-selective mirrors are dichroic mirrors. These are devices that are fabricated by multiple layers of dielectric material placed on a transparent substrate so that they reflect light of one or more wavelength regions yet transmit light of other wavelength regions, as is commonly understood in the art. These mirrors are substantially flat and relatively thin and, by appropriate selection of the dielectric layers, can be designed to reflect and transmit the desired wavelengths of light for a given application. However, it is to be recognized that other wavelength-selective devices which are physically compatible with the structure described and claimed herein may be used without departing from the principles of the invention.

The invention provides for selecting one from among a plurality of wavelength-selective mirrors for placement in the common optical pathway 28 to split it into the first pathway 24 and the second pathway, to match the wavelengths of light that are of interest. It both permits rapid switching from one wavelength-selective mirror to another and ensures that the reflective surface each successive mirror will lie substantially in the same plane, so as to avoid lateral or angular deviation of the propagating light beams from mirror to mirror. Avoiding deviation results from moving the mirrors in and out of the common optical pathway while keeping their reflective surfaces all in the same plane, that is, a plane parallel to the reference plane. Rapid switching results from the relatively low inertia presented by the mirror holder and the fact that the mirror holder can be continuously rotated from mirror to mirror without slopping where measurements at different wavelengths can be synchronized with the positions of the mirrors.

Typically, the reference plane 18, and therefore the axle 14, would be disposed at an angle of 45 degrees to the common optical pathway 28. However it is to be recognized that other angles may be used without departing from the principles of the invention.

The motor 16 would ordinarily be a stepper motor for moving each successive mirror a discrete angular distance to replace the mirror previously disposed in the common optical pathway. However, a continuously rotating motor can be used where called for by the application. Preferably, the motor is a dual purpose device that can operate either in a stepping mode or a continuously rotting mode.

While the wavelength-selective mirror selector of the present invention is particularly adapted for use with wide-field imaging epifluorescence microscopy, may also be used in scanning epifluorescence microscopy and other applications where the rapid selection of different wavelength selective devices is needed, particularly where image registration is important.

As can be seen from FIG. 1, two or more wavelength-selective mirror selectors, may be used in combination with one another. In the specific example shown, the second optical pathway 26 becomes the common optical pathway for a second selector 32. Like the first selector, the second selector has a mirror holder 34, an axle 36 and a motor 38 for rotating the mirror holder in a reference plane 40. A 30 second s;et of wavelength-selective mirrors 42(1)–42(N) having respective reflective surfaces 44(1)–44(N) and optical axes 45(1)–45(N) are disposed on the mirror holder 34, as in the first selector. The mirrors split the optical pathway 26 into a fourth optical pathway 46 and a fifth optical pathway 48.

It is preferred that the mirrors 42(1)–42(N) have a rectangular shape and arrangement as shown in FIG. 2 so that the combination of two wavelength-selective mirror selectors can be made more compact. The compactness results from offsetting the axles 14 and 36 from one another relative to the common optical pathway 28, and the rectangular shape of the mirrors ensures that the selected upper mirror will overlap the selected lower mirror.

Typically, excitation light of a second wavelength would be generated by a second light source 50 and propagate along the fourth optical pathway toward the mirrors 42(1) –42(N), where it would be reflected along optical pathway 26, the common pathway for the second selector 32. Light propagating in the opposite direction along pathway 26 would pass through the selected mirror to the detector 30. Alternatively, the first mirror holder 12 may actually have an open, or optically-transparent aperture instead of a mirror, as shown at 20', so that light of all wavelengths simply passes that mirror holder when the transparent portion is positioned in the optical pathway. It is to be understood that other uses of such a combination of mirror selectors could also be made without departing form the principles of the invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A wavelength-selective mirror selector, comprising:

a mirror holder having a planar reference surface passing there through and providing support at respective planar positions for a plurality of wavelength-selective mirrors whose respective optical axes are perpendicular to said planar reference surface, said mirror holder being disposed so that said planar reference surface is oblique to a common optical pathway; and a motor connected to said mirror holder for rotating said mirror holder in said planar reference surface so as to move said wavelength-selective mirrors into and out of said common optical pathway.

2. The mirror selector of claim 1, wherein said mirror holder comprises a sheet of material have a plurality of apertures there through for receiving respective said wavelength-selective mirrors.

3. The mirror selector of claim 2, wherein said sheet of material is rectangular shaped.

4. The mirror selector of claim 1, wherein the angle between said common optical pathway and said reference surface is substantially about 45 degrees.

5. The mirror selector of claim 1, wherein said motor is adapted to rotate said mirror holder a selected angular amount.

6. The mirror selector of claim 1, further comprising a plurality of said mirrors supported by said mirror holder, said mirrors, when moved into said common optical pathway by said motor, splitting said common optical pathway into a first alternative pathway and a second alternative pathway depending on the wavelength of light propagating along said common optical pathway.

7. The mirror selector of claim 6, wherein said common optical pathway and said reference surface is substantially about 45 degrees.

8. The mirror selector of claim 7, wherein at least one of said wavelength-selective mirrors is a dichroic mirror.

9. The mirror selector of claim 8, wherein at least one of said wavelength-selective mirrors is a dichroic mirror.

10. The mirror selector of claim 6, further comprising a light source disposed so as to, propagate light along said first alternative optical pathway toward said mirror selector, said light source producing a first wavelength of light selected to excite fluorescence emission from a sample of material placed in said common optical pathway, said mirrors reflecting said first wavelength of light while passing respective emission wavelengths of light along said second alternative pathway.

11. The mirror selector of claim 6, further comprising:

at least one said wavelength-selective mirror whose optical axis is perpendicular to said planar reference surface supported by said mirror holder;

a second mirror holder having a second planar reference surface passing there through, said second mirror holder being disposed so that said second planar reference surface is oblique to said second alternative optical pathway;

at least one additional wavelength-selective mirror whose optical axis is perpendicular to said second planar reference surface, said second mirror holder being disposed so that said second planar reference surface is oblique to said second alterative optical pathway; and a motor connected to said second mirror holder for rotating said second mirror holder in said second planar reference surface so as to move said additional wavelength-selective into and out of said second alternative optical pathway.

12. A method for selecting a wavelength-selective mirror for splitting a common optical pathway into two distinct optical pathways based on wavelength, comprising:

providing in a planar array a plurality of wavelength-selective mirrors having respectively distinct light transmission characteristics, each said mirror having a reflective surface substantially parallel to said planar array;

placing said planar array in the common optical pathway so that the plane of said planar array is askew thereto; and rotating said planar array in the plane thereof so as to position a selected one of said wavelength-selective mirrors in said common optical pathway.

13. The method of claim 12, wherein the plane of said planar array is disposed substantially at 45 degrees to the common optical pathway.

14. The method of claim 12, wherein said rotating is continuous so as to position said plurality of mirrors in the common pathway sequentially.

15. The method of claim 12, further comprising placing a light source in relation to said planar array so as to direct a beam of light of a first wavelength toward said selected one of said wavelength-selective mirrors so as to reflect said beam along said common optical pathway, and placing a light detector in relation to said planar array so as to receive light that passes from said common optical pathway through said selected one of said wavelength-selective mirrors.

* * * * *

UNITED STATES PATENT AND TRADEMARK OFFICE
CERTIFICATE OF CORRECTION

PATENT NO.    : 6,309,078 B1
DATED         : October 30, 2001
INVENTOR(S)   : Alexander Dromaretsky and Yuri Osipchuk It is certified that error appears in the above-identified patent and that said Letters Patent is hereby corrected as shown below:

Title page,
Item [57], ABSTRACT,
Line 2, delete "wavelength-selective selective" and insert -- wavelength-selective --.

Column 1,
Line 14, delete "Lagged" and insert -- tagged --;
Line 47, delete "sliding elongate" and insert -- sliding, elongate --.

Column 3,
Line 63, delete "slopping" and insert -- stopping --.

Line 4,
Lines 24-25, delete "30 second s;et" and insert -- second set --.

Signed and Sealed this

Twentieth Day of September, 2005

JON W. DUDAS
*Director of the United States Patent and Trademark Office*